United States Patent [19]

Gordon et al.

[11] Patent Number: 4,905,273
[45] Date of Patent: Feb. 27, 1990

[54] DATA TRANSMISSION SYSTEM

[76] Inventors: Alastair T. Gordon, 61 Dalewood Road, Toronto, Ontario, Canada, M4P 2N4; Michael H. Reichmann, 137 Blantyre Avenue, Toronto, Ontario, Canada, M1N 2R6

[21] Appl. No.: 137,799

[22] Filed: Dec. 24, 1987

[51] Int. Cl.$^4$ ............................................. H04M 11/00
[52] U.S. Cl. ...................................... 379/93; 379/100; 379/221
[58] Field of Search ................... 379/93, 94, 100, 112, 379/113, 207, 221; 358/257

[56] References Cited

U.S. PATENT DOCUMENTS

| | | | |
|---|---|---|---|
| 4,104,486 | 8/1978 | Martin et al. | 179/2 AM |
| 4,113,992 | 9/1978 | Gorham et al. | 379/100 |
| 4,313,036 | 1/1982 | Jabara et al. | 379/207 |
| 4,670,874 | 6/1987 | Sato et al. | 379/93 |
| 4,672,602 | 6/1987 | Hargrave et al. | 379/107 |
| 4,713,837 | 12/1987 | Gordon | 379/93 |

FOREIGN PATENT DOCUMENTS

| | | | |
|---|---|---|---|
| 2404074 | 8/1975 | Fed. Rep. of Germany | 358/84 |
| 3045607 | 7/1982 | Fed. Rep. of Germany | 179/2 AM |
| 0072567 | 6/1981 | Japan | 379/100 |
| 0168760 | 9/1984 | Japan | 379/100 |
| 0013764 | 1/1986 | Japan | 379/100 |
| 0242464 | 10/1986 | Japan . | |
| 0152265 | 7/1987 | Japan . | |
| 0159975 | 7/1987 | Japan . | |

OTHER PUBLICATIONS

P. Josien et al., "External Business Communications Using Public Switched Networks", 1987, pp. 55-73.

"Paging System Broadcasts Nationwide on FM Radio Channel", Electronics, vol. 52, No. 1, Jan. 4, 1979.
PCT, Gomersall, "Preprogrammed Over the Air Marketing Research System", Oct. 10, 1985.

Primary Examiner—Jin F. Ng
Assistant Examiner—Wing F. Chan

[57] ABSTRACT

A device is placed intermediate a data transmitter, such as a facsimile machine and the public switched telephone network, and selectively processes the calls in a predetermined manner. The signals sent by the transmitter are monitored by the process intermediary and when a particular type of signal is identified, the device processes this signal in a different manner. For example, a particular type of signal could be a long distance signal whereupon the device stores the long distance number, supplies a current back to the transmitting device indicating that the connection has not yet been made, and then completes a call to a data transmission network with the process intermediary then connecting the data transmission network with the transmitting device after the device has transmitted the long distance number to the data transmission system. The transmitting device believes the data transmission system is the identified receiver and the data transmission system will transmit the required protocol signals to the transmitting device whereafter the signals then are transmitted in the normal manner. The data transmission system will then transmit this signal through the data transmission system to a regional location and then retransmit the data over telephone lines to the receiver. A modified data receiver is taught which is actuated by means of a non-telephone communication link and the receiver does not require a dedicated line. The modification can be in the form of a process intermediary for use with existing receivers.

15 Claims, 4 Drawing Sheets

DATA TRANSMISSION SYSTEM

BACKGROUND OF THE INVENTION

The present invention relates to data transmission systems and devices and, in particular, relates to data transmission over public switched telephone networks and various devices for carrying this out. The invention is directed to an improved overall combination for transmitting data between a transmitter and a receiver through a system which involves the use of public switched telephone networks. The invention also includes processes for carrying this out as well as particular devices for efficiently carrying out the process.

The transmission of information between sources continues to grow at a rapid rate and companies recognize the importance in having the capability to receive information and transmit information to other parties efficiently. This transmission of information is illustrated in facsimile transmission between parties where both printed and graphic information are transmitted easily. Other forms of data transmission include electronic mail, however, electronic mail normally requires the receiver to check his electronic "mailbox" and only once it is checked can he then receive the information.

Other examples of systems for transmitting of information include the telex system, however, this system requires dedicated transmission lines and particular skills for transmitting of the information. Although the telex system has been in place for many years, facsimile transmission is rapidly eroding the usage of telex and greatly decreasing the importance of telex. This rapid increase in facsimile transmission is possibly due to the simple manner in which the information is transmitted and the mode of transmission via the telephone and the public switched telephone network. Only very limited knowledge of a facsimile machine is required and the system is extremely user friendly.

The problems with facsimile transmission is that it operates best with a dedicated telephone line and the rate of transmission of the information is determined by the particular facsimile machine and the quality of the connection between the transmitter and the receiver. In cases of local calls, the telephone lines are normally sufficient to allow the transmitter to operate at full speed, however, in long distance calls, the quality of the line falls. The facsimile machines automatically adjust and reduce the speed of transmission to ensure the information is properly received. Thus, the facsimile machine operates possibly at its highest speed on a local call where there is no additional charge for time and at its slowest speed on long distance calls where the transmitter is paying for the connect time. The public switched telephone network is also a system designed for voice transmission and the facsimile machine is not using all the capability of that system in transmitting the data. The transmission of pure data is simpler and specialized systems have been designed for the transmission of this data at higher rates of speed while also providing error correction.

There remains a need to allow the effective transmission of data between a transmitter and a receiver combining the advantages of the public switched telephone network and the data transmission systems. These data transmission systems are typically referred to as "packet switched data networks".

SUMMARY OF THE INVENTION

According to the present invention, data transmissions originating from a transmitter are selectively processed whereby these transmissions effectively use either the public switched telephone network for local destinations or a data transmission network and the public switched telephone network for transmission of long distance transmissions.

The present invention also discloses a particular device for determining a particular type of signal which is to be processed in a particular manner originating from a transmitter and redirecting the signal in a particular manner. This device operates in a manner that the transmitter can operate in its conventional manner and none or very little additional instructions are required for transmission of the information. The present invention also relates to the particular steps for carrying out this selective transmission of information between a transmitter and a receiver.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
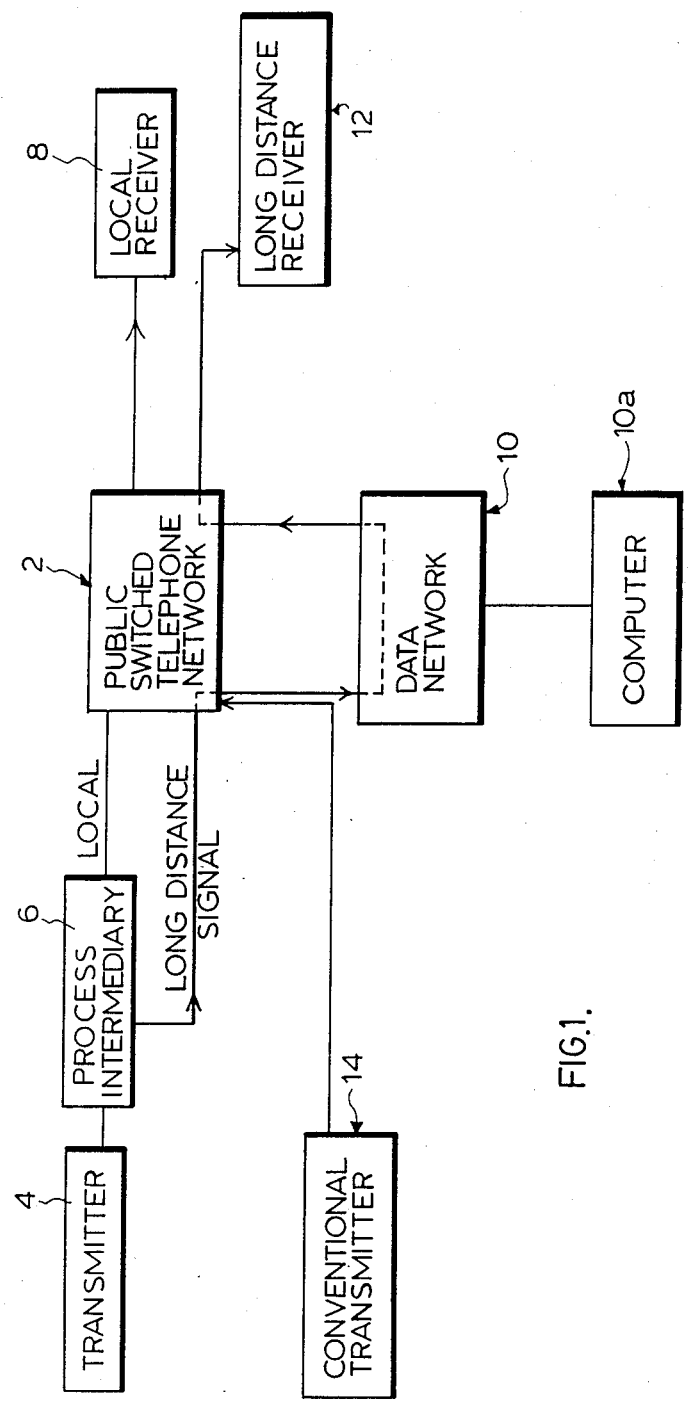
FIG. 1 is a block diagram of the communication network.

The concept of the communication system can be understood with respect to FIG. 1. All transmissions involve the public switched telephone network generally shown as 2. In this case, a transmitter 4 is shown operatively connected to the process intermediary 6 which reviews the signal produced by the transmitter 4 and distinguishes, in this case, between a local call and a long distance call. In the case of a local call, the process intermediary allows the normal transmission to occur, that being a connection between the public switched telephone network 2 and the transmitter 4 with this public switched telephone network 2 forming an operative connection between the transmitter 4 and the local receiver 8. In the case of a long distance transmission, the process intermediary 6 identifies such a signal and causes a different connection to be made. The process intermediary 6 forms an operative link via the public switched telephone network 2 to the data network generally shown as 10. Once this link has been made, the signal originating from the transmitter 4 is transmitted to a computer node of the data network 10. The data network 10 transmits the signal, including the long distance identification code of the long distance receiver 12, through the data network to preferably the closest local station of the data network 10. The data network 10 then completes a further communication with the public switched telephone network, for example by a local call, and causes a connection between the data network 10 and the long distance receiver 12. The data network which has stored the signal when it is received at the local point then transmits the signal to the long distance receiver 12.

In contrast to what would normally occur, two local calls have been made, one between the transmitter 4 and the data network 10 via the process intermediary 6, and a second local call between the data network 10 and the long distance receiver 12. The transmission of the information over the long distance has been accomplished by the data network 10 which, in fact, is basically sitting in parallel with the public switched telephone network. Thus, data which is transmitted by transmitter 4 for a long distance communication is routed to a data network which can more efficiently transmit this information. This information is received by the data network 10 and perhaps stored on disk and then transmitted through the data network for receipt at the other end or the appropriate location in a data network by a computer having the capability to place outgoing calls. The data network 10 will have appropriate error correction for data transmission, and the transmission over the long distance is more efficient than the conventional manner.

To understand the conventional process, a signal is produced by conventional transmitter 14 and, via the public switched telephone network, is operatively connected to the long distance receiver 12 whereafter the transmission of information occurs through the public switched telephone network and at the expense of a long distance telephone charge essentially based on time. Therefore, at the present point in time, conventional transmission of data from a facsimile machine, for example, to a receiver such as another facsimile machine only involves public switched telephone network whereas the present system proposes a further link via a data network for the more efficient transmission of information.

Figure 2:
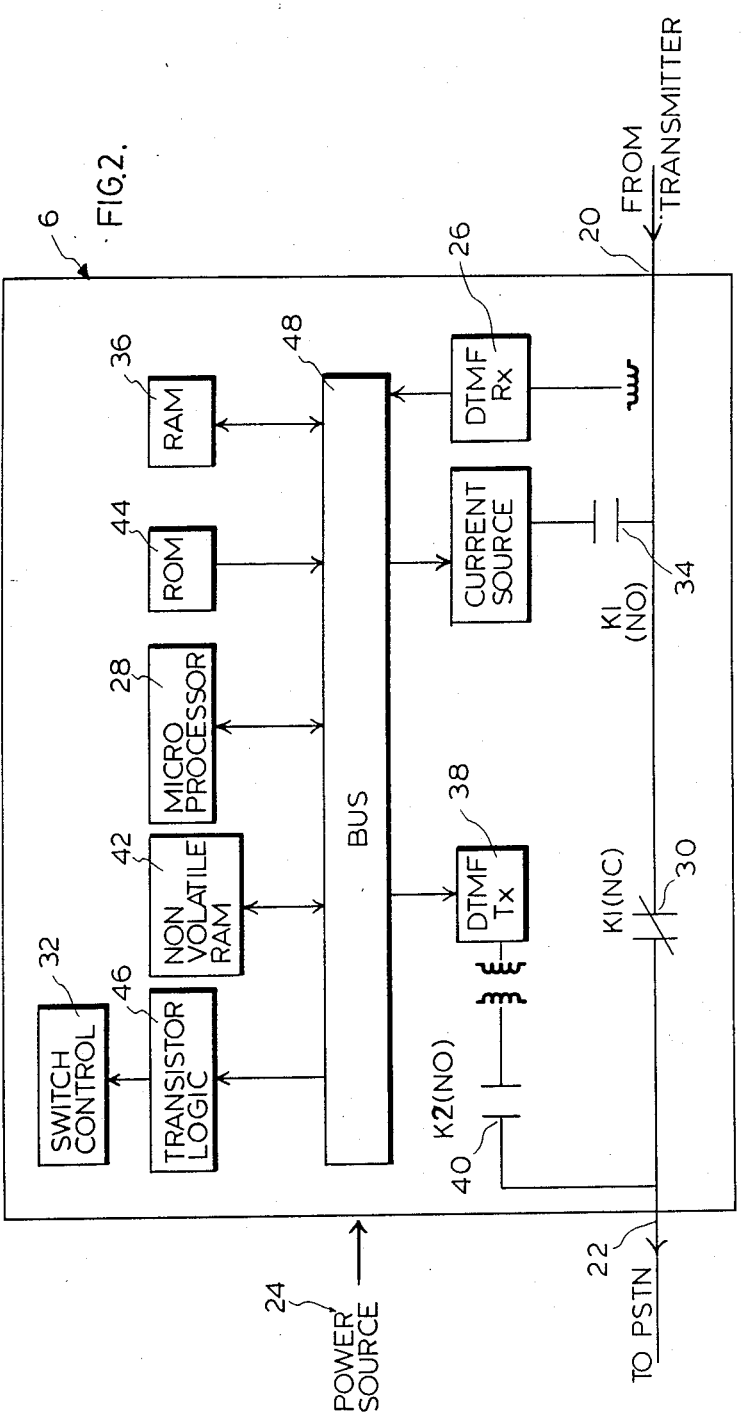
FIG. 2 shows the process intermediary device.

The process intermediary 6 is shown in greater detail in FIG. 2. The process intermediary 6 includes an input 20 from the transmitter such as a facsimile machine and an output 22 which allows connection to the public switched telephone network (PSTN). The process intermediary 6 also includes a power source generally indicated as 24. All signals from the transmitter are passed through the input 20 and are sensed by a dual tone multi-frequency receiver (DTMF Rx) 26 with this signal being reviewed by the micro processor 28 to determine whether this is a local or a long distance telephone communication, for example. Given that the signal is not a long distance signal, the transmission continues in its normal manner through the closed switch K1(NC) 30. This switch is normally closed and allows direct connection from the transmitter to the public switched telephone network. Given that the micro processor determines that this is a signal requiring particular routing, switch 30 is opened via the switch control 32. At the same time, switch K1(NO) 34 is closed and a signal is sent to the transmitter which, in essence, is a false signal indicating that the connection to the public switched telephone network is still in progress. The original signal, which in the case of a long distance call would be the long distance code, the area code and the particular telephone number, is stored in the random access memory generally shown as 36. The micro processor 28 then via the dual tone multi-frequency transmitter 38 (DTMF Tx) transmits the call to the public switched telephone network by closing switch K2(NO) 40. This telephone call will be to the data network generally shown as 10 in FIG. 1. Once this connection has been made, information identifying the particular process intermediary 6 is sent to the data network and this code is pulled from the non-volatile random access memory generally shown as 42. Once this signal has been transmitted, the long distance number and the particular telephone number for which the signal was originally destined is pulled from the random access memory 36 and sent to the data network. Once the required information has been sent to the data network, the process intermediary 6 forms a direct connection by opening switch 40 and switch 34 and closing switch 30 such that the data network is now connected to the transmitter. The data network will then provide the transmitter with the appropriate signal (clear to send signal) indicating that it is ready to receive the message and the transmitter now incorrectly believes that a direct connection has been made between the transmitter and the destined receiver. Therefore, the data transmitter will transmit the signal in its normal manner. The read only memory 44 of the process intermediary 6 allows for program logic and transistor transistor logic 46 allows the micro processor to make the appropriate actuations of switches 30, 34 and 40. All connections between the various components of the process intermediary are shown via the bus 48.

Thus, it can be appreciated from a review of FIG. 2 that the process intermediary 6 does not affect the normal operation of the transmitter 4 and the operator of that transmitter need not have knowledge of the manner in which the signals are being processed. In effect, this redirection of the signal occurs automatically and is transparent to the sender. Furthermore, the installation of this device is extremely simple, merely requiring a plug-in type jack from the transmitter and the conventional plug-in type connection to the public switched telephone network.

As can be appreciated, this is particularly beneficial for facsimile machines, although other forms of transmitters and receivers are possible. The rapid acceptance of facsimile machines has created a need to appropriately process the data signals of these machines in a more efficient manner without departing from the user convenience of such machines. Although the system has been described and requires certain completions, this can occur very rapidly and as such, there is really no appreciable time delay in the transmission of the signal between the transmitter and the receiver. The data network would have a computer with a number of ports for which the process intermediary is already programmed to direct the signal to and at the other end of the data network, a similar arrangement would be in place where the data network would then transmit via the public switched telephone network the signal to the destined receiver.

Figure 3:
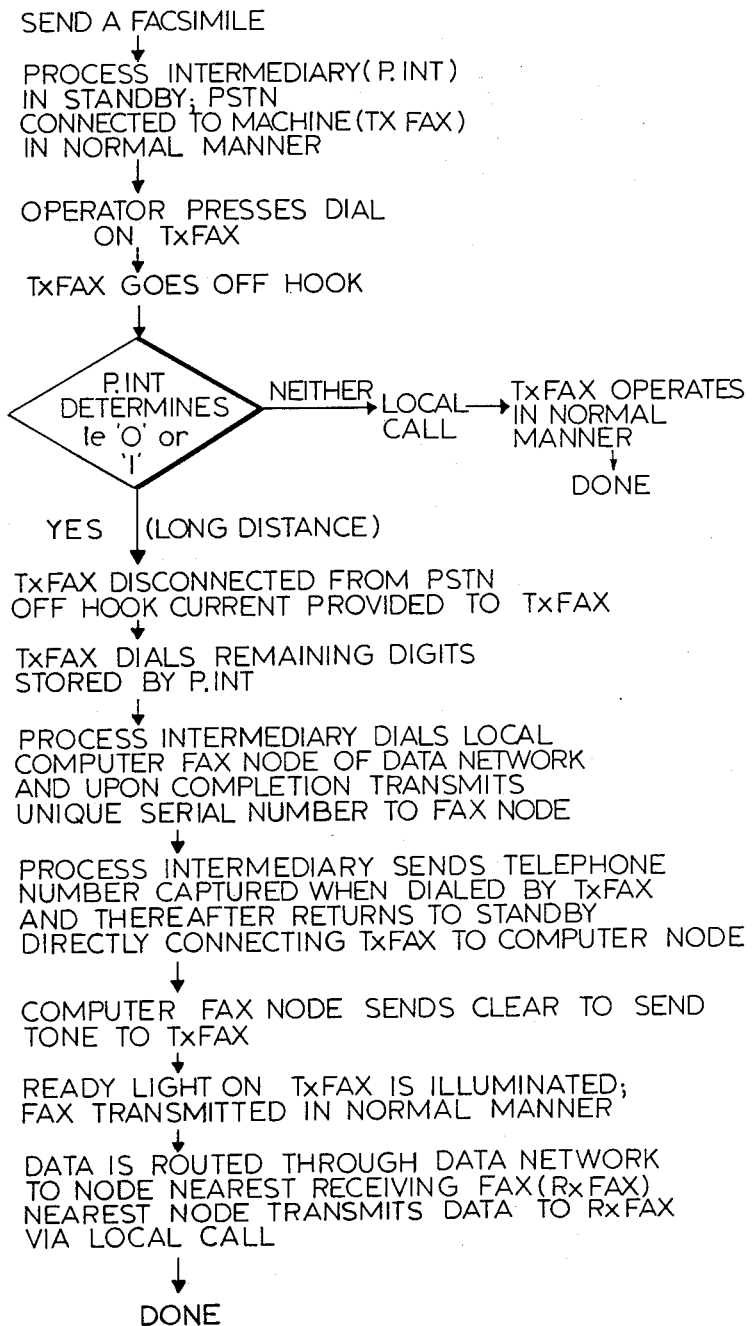
FIG. 3 is a logic diagram showing the various steps and logic of the present method.

The logic flow chart for a facsimile transmission via the process intermediary is shown in FIG. 3. As can be appreciated, depending upon the particular type of transmitter and receiver, various modifications may be required for their particular requirements.

The following is an overview of the operation of a facsimile machine connected with the process intermediary:

1. Operator presses dial on telefax and the telefax goes off hook as the process intermediary in its deenergized states directly connects the public switched telephone network to the facsimile machine. A number is then entered into the facsimile machine and from the first numbers dialed the process intermediary determines whether it is a local or long distance call. If it is a local call, the process intermediary does not interrupt the transmission between the facsimile and the public switched telephone network and the transmission would follow the conventional practice. If the process intermediary determines it is a long distance call, the telefax is disconnected from the public switched telephone network and the process intermediary provides an off hook current to the telefax such that the machine believes the connection with the public switched telephone network is still in place or about to be in place. The facsimile then continues to dial the remaining digits of the telephone number for which the transmission is destined and the process intermediary stores the number.

At this point the facsimile is still disconnected from the public switched telephone network and the process intermediary has stored the number and is providing the facsimile with an off hook current. The facsimile has dialed the number of the receiving telefax and is awaiting the "clear to send" signal from the receiving telefax. The process intermediary has gone to an off hook position relative to the public switched telephone network.

2. The process intermediary causes a connection to be made with the data transmission network via the public switched telephone network. This connection is made via a telephone number stored in memory in the process intermediary. Once this connection is made, the process intermediary sends its unique serial number to the computer node of the data process network. Following this, the process intermediary sends the telephone number of the receiving facsimile machine captured and stored by the process intermediary when dialed by the transmitting facsimile machine. After this information has been transmitted, the process intermediary returns to its de-energized state which directly connects the facsimile machine to the public switched telephone network which is now connected to the data transmission network. The originating facsimile machine is still awaiting the "clear to send" tone. The computer node at the data transmission network now sends the "clear to send" tone to the transmitting telefax machine. This results in the transmitting machine being placed in a "ready" state with the documents then being transmitted in the normal manner. The data transmission system initially stores and then appropriately routes this information through the data transmission network to the appropriate computer node near the receiving facsimile machine. It then, by means of the public switched telephone network, makes a connection with the receiving facsimile and transmits the information much in the manner of facsimile machine to facsimile machine.

Figure 4:
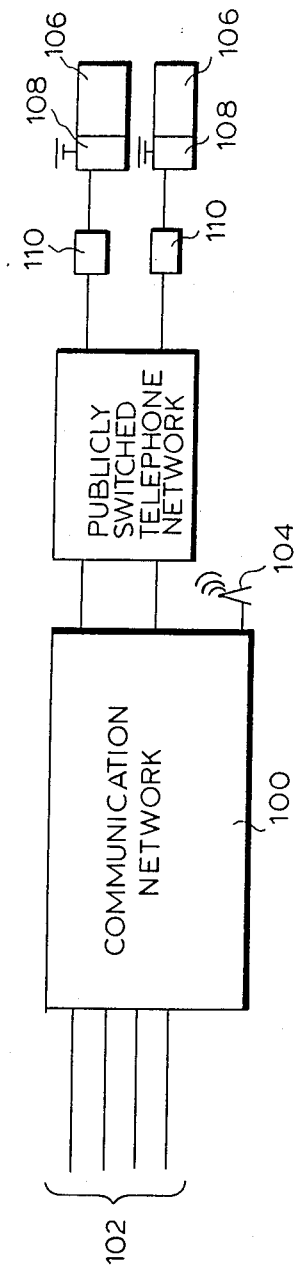
FIG. 4 illustrates a modified apparatus for use in the case of a non-dedicated line.

FIG. 4 illustrates a different variation with respect to improving facsimile transmissions by not requiring a dedicated line while still efficiently receiving transmissions. FIG. 4 shows a common collection source such as a data communication network 100 which can receive signals 102 from many locations and transmit them through the data communication network. At each of the local receiving nodes, a transmitter 104 provides the capability of transmitting a signal or incorporating a signal in a transmitted signal, such as a broadcast signal, which will identify the code of a particular facsimile machine. For example, this identification code could be provided in a side band of a conventional broadcast signal much in the manner disclosed in U.S. Pat. No. 4,713,837.

Each of the separate facsimile machines 106 will include broadcast receiving means 108 for monitoring the particular broadcast and determining whether its unique code is included in that broadcast signal. Once its code is identified, this indicates that a transmission destined for it has been received and the facsimile machine will then, by an intermediary 110, similar to process intermediary 6, seize the non-dedicated line when it is available and place a call to the appropriate computer node of the data transmission network 100 and, upon completion of this call, identify itself in the manner of process intermediary 6 whereafter the data communication network 100 can then transmit the signal to the facsimile machine 106. The intermediary 110, in combination with broadcast receiving means, allow the facsimile machine 106 to share a non-dedicated line efficiently. All transmissions are received and stored by the communication network 100 and this includes transmissions transmitted directly to the computer node of the communication network or transmissions at least partially transmitted by the communication network in the manner described in FIGS. 1 through 3. It is only the procedure for the final transmission to the receiver from the node which changes. This modification, to allow receiver 106 to function efficiently on a non-dedicated line, can be incorporated within new receivers or can be incorporated in a separate stand alone unit for existing receivers. Thus, broadcast receiving means 108 can be made integral with intermediary 110 for use with existing receivers such as facsimile machines.

Thus, the need for a dedicated line is avoided and the cost associated with the dedicated line is avoided. Furthermore, the requirement for a full and complete broadcast network is not required as these identification codes can be incorporated in existing broadcast signals.

A facsimile or other receiver adapted in the manner of FIG. 4 will receive all messages, however, the actual transmission to the facsimile machine will be delayed depending upon the availability of the non-dedicated line. The user is assured that even simultaneous transmissions to it, which in the conventional manner could not be completed, will be received by the data communication network and then these messages will be subsequently forwarded to the particular facsimile machine as time allows. The facsimile machine is always alerted to the presence of a transmission destined for it by a non-telephone communication link whereafter that facsimile machine via automatic dialing techniques and equipment makes a connection with the appropriate source having the signal stored and identified for the particular facsimile machine.

The broadcast or non-telephone communication link can take many forms and any form which actuates or alerts the receiver in a manner to allow the machine to share a telephone line is sufficient.

Both of the above systems teach modified processes whereby a data transmission network on its own or in combination with other elements can improve the transmission of data between one facsimile machine and another or one data transmitter and another data receiver which information otherwise would be transmitted via the public switched telephone network. The availability, convenience and ease of using the public switched telephone network is maintained, while improving the signal quality in at least some applications. Other advantages are also possible as previously described.

A third improvement in the service can be provided by the data transmission network in that, general information can be stored and available upon request. For example, if the user, a facsimile machine, wished information on the Dow Jones, they could dial a particular number which the process intermediary would recognize is a further particular signal and make an appropriate connection with a computer 10a (FIG. 1) of the data transmission network. This data transmission network would then recognize the number as a request for the latest stock or listings of the Dow Jones, for example, or possibly a weather report or flight arrivals or other information, all of which could have their own codes, and then transmit this information back to the facsimile machine. Thus, further transmission of common information is available upon demand. Other services possible via the system would be the ability to send one telefax message to a host of receivers. Again, a special code could be developed whereby that particular subscriber has already previously identified addresses of people to receive common messages and upon transmission of that code to the data communication network it will be then distributed through the data communication network, resulting in transmission to each of the predetermined addresses. This avoids the problem and duplication of transmissions between each individual facsimile machine.

A particular simple manner of transmitting a signal to a facsimile machine having a non-dedicated line would be to have that user identify a particular node of the data communication network followed by his own telephone number or code and the transmitter would then dial the first number followed by the code of the receiver. The transmitting facsimile machine would transmit all numbers, although the first portion would be used for transmission to the particular node. This facsimile machine and the public switched telephone network does not use the following numbers, although each facsimile machine is designed to transmit up to 32 digits. Therefore, this additional identification code will be transmitted and, when subsequently received, it is used for contacting the receiver for which the signal is destined. In order to ensure the subsequent numbers are received, the pause key can be used to provide a time gap for the data network to be connected.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. In combination, a plurality of data receivers each having a unique telephone identification code, a plurality of data transmitters adapted to transmit signals to particular receivers, a telephone system adapted to operatively connect a data transmitter to a particular data receiver identified by said telephone identification code, a plurality of process means each associated with one data transmitter and located between said respective data transmitters and said telephone system, each process means identifying long distance telephone signals originating from said respective data transmitter and redirecting via said telephone system the long distance telephone signal to a predetermined data transmission system adapted to receive the signal, and wherein said predetermined data transmission system transmits the signal through the data transmission system to a particular point in the data transmission system and thereafter said data transmitting system transmits the signal via said telephone system to the appropriate data receiver.

2. In a data transmission system for transmitting data from one data receiver/transmitter to another data receiver/transmitter, said data transmission system having a host of like data receiver/transmitters and wherein each data receiver/transmitter is adapted to ineract with a public switched telephone network, the improvement comprising a plurality of process means each associated with one of said data receiver/transmitters and located between the data receiver/transmitter and the public switched telephone network for identifying certain long distance data transmissions originating from the associated data receiver/transmitter and directing the long distance data transmissions to a data network; said data network having a plurality of receiver/transmitter stations interconnected by the data network, each receiver/transmitter station being adapted to receive via the public switched telephone network a data transmission from an originating data receiver/transmitter which data transmission includes a telephone address of a receiving data receiver/transmitter for which the data transmission is destined and directs the data transmission to a different receiver/transmitter station via said data network, and thereafter said different receiver/transmitter station by means of said telephone address and the public switched telephone network delivers the data transmission to said receiving data receiver/transmitter identified by said telephone address.

3. In a data transmission system as claimed in claim 2 wherein at least some of said data receiver/transmitters include a non-telephone communication channel for actuating the data receiver/transmitter to automatically place an outgoing telephone communication to a telephone address of one of said receiver/transmitter stations and to cause the data receiver/transmitter to identify itself to the one receiver/transmitter station, and wherein said data network includes means to produce an actuating signal transmitted over the non-telephone communication channel when a data transmission is received by one of said stations destined for said one receiver/transmitter.

4. In a data transmission system as claimed in claim 3 wherein said non-telephone communication channel is an over-the-air broadcast channel and wherein said actuating signal is produced and transmitted as an over-the-air broadcast.

5. In a data transmission system as claimed in claim 4 wherein said host of like data receiver/transmitters are facsimile machines.

6. In combination, a data receiving device connectable to a public switched telephone network, connecting means having a unique code and selectively connecting via said public switched telephone network said receiving device to a predetermined receiver/transmitter station of a plurality of receiver/transmitter stations interconnected by a data transmission system for transmitting data between receiver/transmitter stations, said connecting means including broadcast receiving and process means, said broadcast receiving and process means being capable of receiving a broadcast signal and processing the broadcast signal to determine whether the unique code identifying the connecting means is present and, if so, selectively connecting said receiving device with said predetermined receiver/transmitter station and thereby facilitating the transmission of data therebetween via the public switched telephone network, said combination cooperating to transmit data destined for said data receiving device from at least one receiver/transmitter station to said predetermined receiver/transmitter station and thereafter to said data receiving device.

7. In combination as claimed in claim 6, including a plurality of data receiver/transmitters adapted to interact with the public switched telephone network and a plurality of process means each associated with one of said data receiver/transmitters and located between the data receiver/transmitter and the public switched telephone network for identifying certain long distance data transmissions originating from the associated data receiver/transmitter and directing the long distance data transmissions to one of said receiver/transmitter stations, and wherein each receiver/transmitter station is adapted to receive via the public switched telephone network a data transmission from an originating data receiver/transmitter which data transmission includes a telephone address of a receiving data receiver/transmitter for which the data transmission is destined and directs the data transmission to a different receiver/transmitter station via said data network, and thereafter said different receiver/transmitter station by means of said telephone address and the public switched telephone network delivers the data transmission to said receiving data receiver/transmitter identified by said telephone address.

8. In combination as claimed in claim 7 wherein said plurality of data receiver/transmitters are facsimile machines.

9. In combination as claimed in claim 8 wherein said connecting means has associated therewith computer means programmed such that a telephone line is only seized when available, and wherein said facsimile machine has associated therewith a broadcast communication receiving means for receiving information regarding data to be sent to the facsimile machine by said predetermined receiver/transmitter station whereby the facsimile machine can share a telephone line with other telephone equipment.

10. A method for transmitting data from an originating data receiver/transmitter to a destined data receiver/transmitter selected from a host of like data receiver/transmitters, each of which is adapted to interact with a public switched telephone network, and wherein said host of like data receiver/transmitters are interconnected to form a data network; said method comprising the method steps of upon initiating of a data transmission at an originating data receiver/transmitter, electronically selecting particular transmissions and directing the particular transmission to a first receiver/transmitter station, transmitting the data transmission through the data network to a second receiver/transmitter station located in closer proximity to the destined data receiver/transmitter than said first receiver/transmitter station, and thereafter determining an address of the destined receiver/transmitter from the data transmission and delivering the data transmission to the destined receiver/transmitter by a telephone communication completed between the destined receiver/transmitter and the second receiver/transmitter station.

11. A method as claimed in claim 10 including the steps of actuating the destined data receiver/transmitter when a data transmission has been received causing said destined receiver/transmitter to initiate the telephone communication with the second data receiver/transmitter station, producing a signal identifying the destined receiver/transmitter and transmitting the signal to the second data receiver/transmitter station by means of the initiated telephone communication, whereafter the data transmission is delivered to the destined receiver/transmitter.

12. A method as claimed in claim 10, wherein the step of determining an address is accomplished by extracting a telephone address of the destined receiver/transmitter from the data transmission.

13. In a data transmission system including a plurality of facsimile machines and other data receiver/transmitter devices interconnected by a telephone system, the improvement comprising at least some of said plurality of facsimile machines each including an associated routing device connecting the facsimile machine to the telephone system, said routing device monitoring a sequence of digits dialed from the facsimile machine and capable of identifying at least one particular dialed sequence of digits which is to be processed in a different manner by completing a telephone communication with a predetermined computer by means of a predetermined telephone number known to said routing device, said predetermined computer upon completion of said telephone communication transmitting to said facsimile machine information in accordance with the particular dialed sequence of digits whereby the facsimile machine may be used as an information terminal.

14. In a data transmission system as claimed in claim 13, wherein said associated routing device is integral with the associated facsimile machine.

15. In a data transmission system as claimed in claim 13, wherein said routing device is connected to the associated facsimile machine.

* * * * *